United States Patent
Hwang et al.

(10) Patent No.: US 8,965,686 B2
(45) Date of Patent: Feb. 24, 2015

(54) APPARATUS AND METHOD FOR COMPUTING VEHICLE PATH BY CONSIDERING SATELLITE COMMUNICATION CHANNEL STATES

(71) Applicants: Ki Min Hwang, Daejeon (KR); Jong Wan Heo, Daejeon (KR); Kun Sup Kwon, Daejeon (KR); Chang Hyun Yoo, Daejeon (KR)

(72) Inventors: Ki Min Hwang, Daejeon (KR); Jong Wan Heo, Daejeon (KR); Kun Sup Kwon, Daejeon (KR); Chang Hyun Yoo, Daejeon (KR)

(73) Assignee: Agency for Defense Development, Daejon (KR)

( * ) Notice: Subject to any disclaimer, the term of this patent is extended or adjusted under 35 U.S.C. 154(b) by 0 days.

(21) Appl. No.: 14/077,623

(22) Filed: Nov. 12, 2013

(65) Prior Publication Data

US 2014/0336923 A1    Nov. 13, 2014

(30) Foreign Application Priority Data

May 7, 2013    (KR) .......................... 10-2013-0051411

(51) Int. Cl.
| G05D 1/06 | (2006.01) |
| G01C 21/00 | (2006.01) |
| G01C 21/34 | (2006.01) |

(52) U.S. Cl.
CPC ....................................... G01C 21/34 (2013.01)
USPC .......................................................... 701/423

(58) Field of Classification Search
CPC .................. G08G 1/096811; G08G 1/096775; G08G 1/096827; G08G 1/096844; G01C 21/3492
USPC .......................................................... 701/423
See application file for complete search history.

(56) References Cited

FOREIGN PATENT DOCUMENTS

| KR | 1020000021308 A | 4/2000 |
| KR | 1020040044665 A | 5/2004 |
| KR | 1020060011586 A | 2/2006 |
| KR | 100575105 B1 | 4/2006 |
| KR | 100725728 B1 | 5/2007 |
| KR | 1020090106610 A | 10/2009 |
| KR | 1020090127425 A | 12/2009 |

OTHER PUBLICATIONS

Park, No-Uk, "Optimal Path Search Algorithm for Urban Applying Received Signal Strength on Satellite Communication Environment", Annual Conference of the Korean Sensors Society (2012) published on Dec. 6, 2012.

*Primary Examiner* — Maceeh Anwari
(74) *Attorney, Agent, or Firm* — Scully, Scott, Murphy & Presser P.C.

(57) ABSTRACT

Disclosed are an apparatus and method for computing a vehicle path by considering satellite communication channel states. The method includes: searching for a plurality of candidate paths, each path connected from a starting point to a destination; analyzing a satellite communication channel state with respect to each of the candidate paths, based on a receiving sensitivity of an electric wave received from a satellite; setting one of the candidate paths as a first path, based on the analyzed satellite communication channel states; and mapping the first path onto a map, and displaying the first path on a display unit.

17 Claims, 6 Drawing Sheets

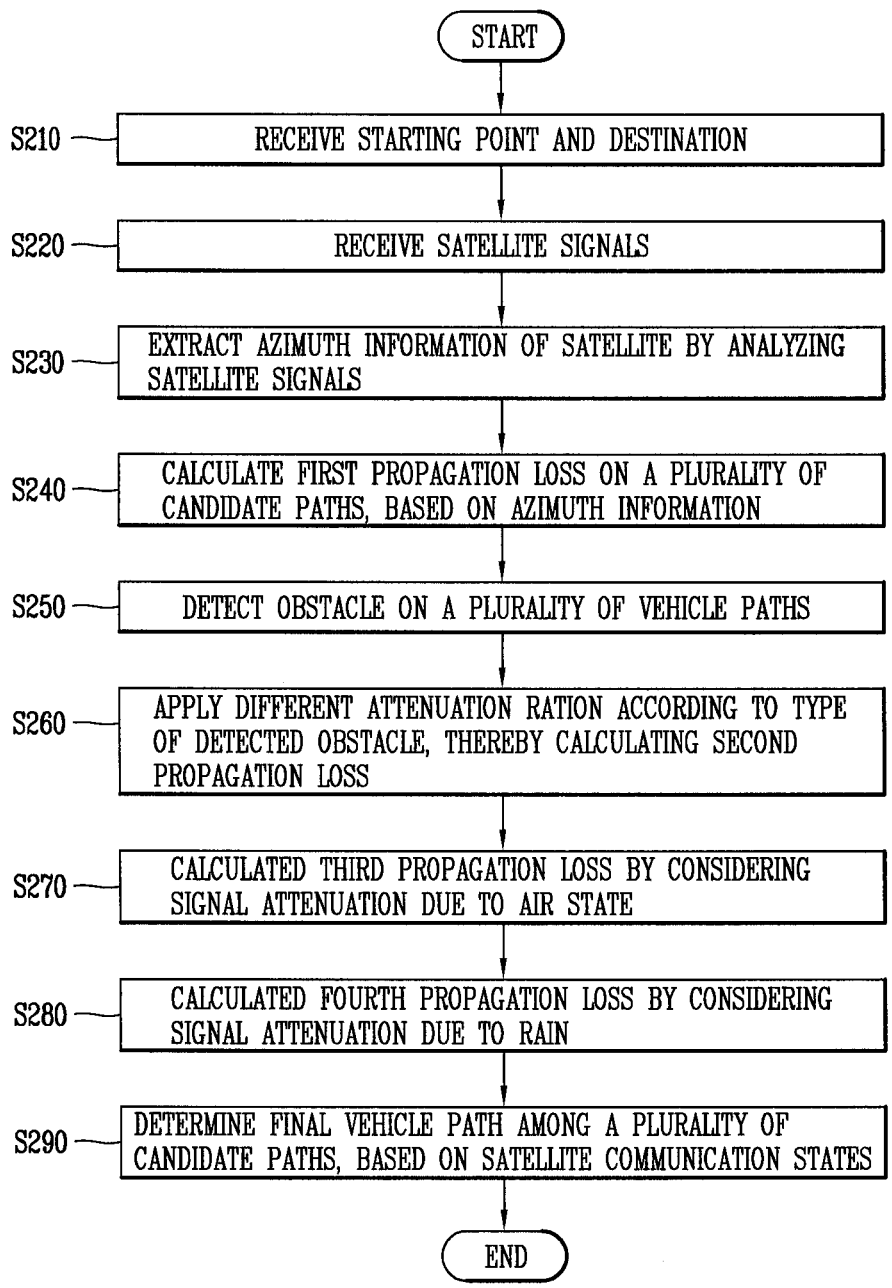

APPARATUS AND METHOD FOR COMPUTING VEHICLE PATH BY CONSIDERING SATELLITE COMMUNICATION CHANNEL STATES

CROSS-REFERENCE TO RELATED APPLICATION

Pursuant to 35 U.S.C. §119(a), this application claims the benefit of earlier filing date and right of priority to Korean Application No. 10-2013-0051411, filed on May 7, 2013, the contents of which is incorporated by reference herein in its entirety.

BACKGROUND OF THE DISCLOSURE

1. Field of the Disclosure

The present disclosure relates to an apparatus and method for computing a vehicle path by considering satellite communication channel states, and particularly, to an apparatus and method for computing a vehicle path by considering satellite communication channel states, capable of acquiring an optimum communication channel from a starting point to a destination by considering electric wave characteristics on a set path.

2. Background of the Disclosure

A Global Navigation Satellite System (GNSS) is a system for location-tracking with respect to an object on the earth using an artificial satellite network, which includes GLONASS, Galileo Project, GPS, etc.

In a downtown area, buildings around a user form a low receiving sensitivity with respect to satellite signals. This may cause some satellite signals not to be received. However, even if specific satellite signals are in a blocked state due to the buildings, multi-path signals reflected by other peripheral buildings can be received.

Especially, in an area concentrated with high buildings, satellite signals of which visibility cannot be acquired due to buildings are frequently received. As a result, a receiver inaccurately calculates a distance between satellites and a user, thereby providing the user with location information having a large error. Under such satellite communication channel state, a position accuracy is degraded to cause a limitation in searching for an optimum path.

A technique for compensating for an error occurring between a satellite and a receiver may include a technique for preventing mutual interference through a vertical conversion in a parity space, a technique for determining a multi-path according to whether a received satellite signal is normal or not, a technique for analyzing a dilution of precision (DOP) of a downtown area using 3D geographical information and orbital information of a navigation satellite, a technique for changing a path into a road of low congestion, and a technique for compensating for a common error of GPS signals.

Such techniques have been used to detect a malfunction inside a receiver, to search for an out-of-order signal based on source data inside the receiver, to provide traffic information or signal light information rather than position reliability, or to compensate for a common error. However, an error due to multi paths occurring in a downtown area is not an error occurring from a GPS receiver. Therefore, there is a difficulty in enhancing positioning accuracy with such techniques.

The conventional location information-based navigation system sets a guidance path under a condition such as a shortest path or a shortest time, when calculating a path from a starting point to a destination. In some mobile communication-based navigation systems, a path is calculated by considering traffic on the path.

However, in the conventional path computation method, a satellite communication channel state of a corresponding path is not considered. As a result, in a dangerous area where satellite signals are not received, or in a downtown area concentrated with high buildings, a receiving sensitivity with respect to satellite signals may be degraded.

Especially, in the domestic area of which 70% is a mountainous area, a receiving sensitivity and a receiving level with respect to satellite electric waves greatly influence on a driving path of a vehicle (vehicle path). Further, if a user drives a vehicle while being provided with information on a path where a receiving sensitivity with respect to satellite signals is low, the user may not be continuously provided with the information. In a worse case, the user may not arrive at a destination on time, or may get lost in a strange place.

Accordingly, an apparatus for computing a vehicle path, capable of searching for a path where a communication channel more than a prescribed receiving sensitivity is acquired, is required.

SUMMARY OF THE DISCLOSURE

Therefore, an aspect of the detailed description is to provide an apparatus and method for computing a vehicle path by considering satellite communication channel states from a starting point to a destination.

To achieve these and other advantages and in accordance with the purpose of this specification, as embodied and broadly described herein, there is provided a method for computing a vehicle path by considering satellite communication channel states, the method comprising: searching for a plurality of candidate paths, each path connected from a starting point to a destination; analyzing a satellite communication channel state with respect to each of the candidate paths, based on a receiving sensitivity of an electric wave received from a satellite; setting one of the candidate paths as a first path, based on the analyzed satellite communication channel states; and mapping the first path onto a map, and displaying the first path on a display unit.

In an embodiment, the method may further comprise: selecting a second path corresponding to a search condition, from the plurality of candidate paths; and mapping the second path onto the map, and displaying the second path on the display unit together with the first path.

In an embodiment, the method may further comprise: receiving one of the first path and the second path from a user; and providing guidance service to the destination, using the selected path and GPS information received from the satellite.

In an embodiment, the search condition may include at least one of a shortest distance, a shortest time, via highway and via roadway.

In an embodiment, the step of analyzing a satellite communication channel state_may include: extracting azimuth information from a satellite signal received from the satellite; calculating propagation loss with respect to each of the candidate paths, based on the azimuth information; and analyzing the satellite communication channel state based on the calculated propagation loss.

In an embodiment, the propagation loss may be distance attenuation of the satellite signal, which occurs due to a distance between a position on each of the candidate paths and the satellite.

In an embodiment, the step of calculating propagation loss may include: detecting one or more obstacles positioned within a prescribed range based on a position on each of the candidate paths; and calculating propagation loss occurring due to the detected obstacle.

In an embodiment, in the step of calculating propagation loss, a different attenuation ratio may be applied according to a type of the obstacle.

In an embodiment, the step of calculating propagation loss may include: receiving, from a server, weather information of a position on each of the candidate paths; and calculating propagation loss occurring due to weather, based on the received weather information.

In an embodiment, the propagation loss may be at least one of rain attenuation of the satellite signal occurring due to rain, and air attenuation of the satellite signal occurring due to air.

In an embodiment, the weather information may include at least one of an atmospheric pressure, a temperature, a humidity and a rainfall per hour.

To achieve these and other advantages and in accordance with the purpose of this specification, as embodied and broadly described herein, there is also provided an apparatus for computing a vehicle path by considering satellite communication channel states, the apparatus comprising: a user input unit configured to receive at least one of a starting point and a destination; a path calculation unit configured to calculate a plurality of candidate paths, each path connected from the starting point to the destination; an electric wave analysis unit configured to analyze a satellite communication channel state with respect to each of the candidate paths, based on a receiving sensitivity of an electric wave received from a satellite; and a controller configured to select one of the candidate paths as a first path based on the analyzed satellite communication channel states, and configured to output the first path by mapping onto a map.

In an embodiment, the controller may be configured to select a second path corresponding to a search condition, from the plurality of candidate paths, and configured to output the second path together with the first path by mapping onto the map.

In an embodiment, upon selection of one of the first path and the second path, the controller provides guidance service to the destination, based on the selected path and GPS information received from the satellite.

In an embodiment, the electric wave analysis unit may include a distance attenuation unit configured to analyze a first propagation loss, distance attenuation occurring due to a distance between a position on each of the candidate paths and the satellite.

In an embodiment, the electric wave analysis unit may further include an obstacle attenuation unit configured to detect an obstacle which exists within a prescribed range based on a position on each of the plurality of candidate paths, and configured to analyze a second propagation loss occurring due to the detected obstacle.

In an embodiment, the obstacle attenuation unit may be configured to analyze a second propagation loss by applying a different attenuation ratio according to a type of the obstacle.

In an embodiment, the obstacle attenuation unit comprises at least one of: a building attenuation unit configured to search for buildings which exist within a prescribed range based on a position on each of the plurality of candidate paths, and to analyze propagation loss occurring due to the searched buildings; and a ground attenuation unit configured to analyze propagation loss due to a ground corresponding to a position on each of the plurality of candidate paths.

In an embodiment, the electric wave analysis unit may further include an air attenuation unit configured to analyze a third propagation loss, air attenuation occurring due to air at a position on each of the candidate paths.

In an embodiment, the electric wave analysis unit may further include a rain attenuation unit configured to analyze a fourth propagation loss, rain attenuation occurring due to rain at a position on each of the candidate paths.

In the present invention, a vehicle path, which has an optimum communication channel from a starting point to a destination, can be calculated by considering electric wave characteristics in a downtown area, an open terrain and a mountainous territory.

Further, a satellite signal strength at each section can be derived by considering signal attenuation due to a distance between the satellite and a position on each of the plurality of candidate paths, signal attenuation due to buildings on a path, signal attenuation due to air, signal attenuation due to rain, and signal attenuation due to an area. A vehicle path, set to pass through only sections having a predetermined signal strength or more than, can be calculated based on the derived satellite signal strength.

That is, a path, which corresponds to a search condition such as a shortest section and a minimum time-taken section, and having a communication channel more than a predetermined receiving sensitivity, can be provided to a user.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 8 is a flowchart for explaining, in more detail, a method for computing a vehicle path according to an embodiment of the present invention.

DETAILED DESCRIPTION OF THE DISCLOSURE

Description will now be given in detail of the exemplary embodiments, with reference to the accompanying drawings.

For the sake of brief description with reference to the drawings, the same or equivalent components will be provided with the same reference numbers, and description thereof will not be repeated. A term of "A or B" may include "A", "B", or "A and B" in the exemplary embodiments.

Though terms of 'first', 'second', etc. are used to explain various components, the components are not limited to the terms. The terms are used only to distinguish one component from another component. For example, a first component may be referred to as a second component, or similarly, the second component may be referred to as the first component within the scope of the present invention.

Terms defined in this specification are merely exemplary, and do not limit the present invention. A singular expression includes a plural concept unless there is a contextually distinctive difference therebetween. In the present invention, a term of "comprises" or "comprising" should not be interpreted as if it absolutely includes a plurality of components or steps of the specification. Rather, the term of "comprises" or "comprising" may not include some components or some steps, or may further include additional components.

A term of "unit" used in one embodiment of the present invention means a hardware component or a software component, and the "unit" is configured to perform a specific function. However, the term of "unit" is not limited to a software or hardware component. The term of "unit" may be configured to be included in a storage medium which can be addressed, or may be configured to operate one or more processors. For instance, the "unit" includes software components, object-oriented software components, class components, and task components, processes, functions, attributes, procedures, sub-routines, segments of program codes, drivers, firmware, micro codes, circuits, data, database, data structures, tables, arrays and variables. The functions performed by the components and the units may be combined with a smaller number of components and units, or may be performed by additional components and units.

Unless differently defined, all the terms used herein with including technical or scientific terms have the same meaning as terms generally understood by those skilled in the art relating to the field of the present invention. Terms defined in a general dictionary should be understood so as to have the same meanings as contextual meanings of the related art. Unless definitely defined in the present invention, the terms are not interpreted as ideal or excessively formal meanings.

Figure 1:
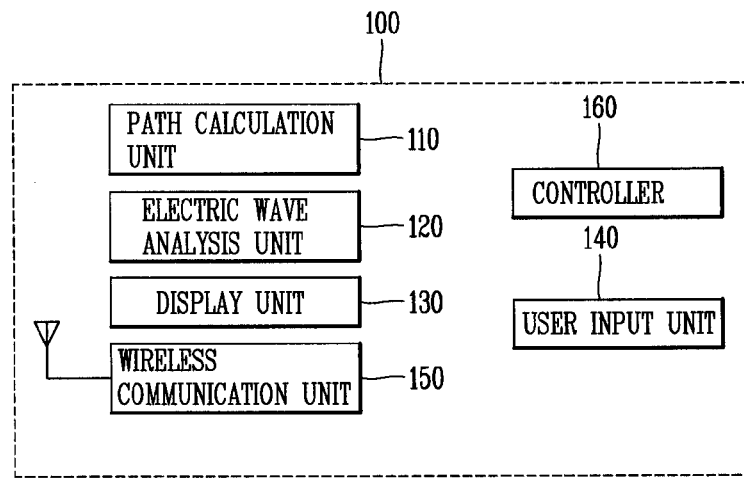
FIG. 1 is a block diagram illustrating a configuration of an apparatus for computing a vehicle path by considering satellite communication channel states according to an embodiment of the present invention.

FIG. 1 is a block diagram illustrating a configuration of an apparatus for computing a vehicle path according to an embodiment of the present invention.

Referring to FIG. 1, the apparatus 100 for computing a vehicle path comprises a wireless communication unit 150, a user input unit 140, a display unit 130, a path calculation unit 110, an electric wave analysis unit 120 and a controller 160. Such apparatus 100 for computing a vehicle path by considering satellite communication channel states may be a navigation system or part of a configuration of the navigation system. That is, the apparatus 100 for computing a vehicle path may provide path information to a user, using a calculated path and GPS information.

The apparatus 100 for computing a vehicle path may include not only a navigation system, but also a mobile terminal such as a tablet, a portable phone, a Personal Communications Services (PCS) phone, and a synchronous/asynchronous International Mobile Telecommunication (IMT)-2000. Further, the apparatus 100 for computing a vehicle path may include a central processing unit and a memory, such as a Palm Personal Computer, a Personal Digital Assistant (PDA), a smart phone, a Wireless Application Protocol (WAP) phone, and a mobile play-station). Accordingly, the apparatus 100 for computing a vehicle path may comprehensively mean a wire/wireless home appliance (communication device) capable of displaying a guidance map.

Hereinafter, the apparatus 100 for computing a vehicle path by considering satellite communication channel states according to the present invention will be explained in more detail.

The wireless communication unit 150 may include one or more constitutional components allowing wireless communication between the apparatus 100 for computing a vehicle path and a wireless communication system or between the apparatus 100 for computing a vehicle path and a network in which the apparatus 100 for computing a vehicle path is located. For example, the wireless communication unit 150 may include a broadcasting receiver module, a wireless Internet module, a short-range communication module, a location information module, and the like.

The broadcasting receiver module receives broadcasting signals and/or broadcasting-related information from an external broadcasting management server through a broadcasting channel. The broadcasting-related information may be information related to a broadcasting channel, a broadcasting program, or a broadcasting service provider. The broadcasting related information may be provided even through a mobile communication network and in this case, may be received by a mobile communication module. A broadcasting signal and/or broadcasting related information received through the broadcasting receiver module can be stored in a memory (not shown).

The wireless Internet module refers to a module for a wireless Internet access. This module may be internally or externally coupled to the apparatus 100 for computing a vehicle path. The wireless Internet technique may include a WLAN (Wireless LAN) (Wi-Fi), Wibro (Wireless broadband), Wimax (World Interoperability for Microwave Access), HSDPA (High Speed Downlink Packet Access), etc.

The short-range communication module refers to a module for short-range communication. As the short range communication technologies, Bluetooth, radio frequency identification (RFID), infrared data association (IrDA), ultra-wideband (UWB), ZigBee, etc., may be used.

The location information module is a module for checking or acquiring the location of the apparatus 100 for computing a vehicle path. For example, the location information module may include a GPS (Global Positioning System) module that receives location information of the apparatus 100 for computing a vehicle path, through satellite communication.

The user input unit 140 generates input data to control an operation of the apparatus 100 for computing a vehicle path. The user input unit 140 may be configured by including a keypad, a dome switch, a touch pad (pressure/capacitance), a jog wheel, a jog switch, and the like.

An output unit is configured to provide an output for audio signal, video signal, or alarm signal, and the output unit may include the display unit 130, an audio output module, an alarm unit, and a haptic module.

The display unit 130 displays or outputs information processed in the apparatus 100 for computing a vehicle path. For example, when the apparatus 100 for computing a vehicle path operates, the display unit 130 can display a User Interface (UI) or a Graphic User Interface (GUI) associated with a path guidance.

The display unit 130 may also include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. A rear surface of the display unit 130 may also be implemented to be optically transparent. That is, the display unit 130 includes a first surface and a rear surface overlapping each other, and the first surface and the second surface may be configured to be transparent or light-transmissive. Under this configuration, a user can view an object positioned at a rear side of the apparatus 100 for computing a vehicle path, through a region occupied by the display unit 130. Such display nit 130 may be referred to as 'transparent display unit'

The display unit 130 may be implemented in two or more in number according to a configured aspect of the apparatus 100 for computing a vehicle path. For instance, a plurality of displays may be arranged on one surface integrally or separately, or may be arranged on different surfaces of the apparatus 100 for computing a vehicle path.

The audio output module outputs audio data received from the wireless communication unit 150 or stored in the memory in a guide mode, a voice selection mode, a broadcast reception mode, and the like. Also, the audio output module can output an audio signal associated with the function performed by the apparatus 100 for computing a vehicle path (for example, a path guidance sound, etc.). The audio output module may also include a receiver, a speaker, a buzzer, and the like.

The alarm unit outputs a signal to notify the occurrence of an event of the apparatus 100 for computing a vehicle path. Examples of events that could occur in the apparatus 100 for computing a vehicle path include a key signal input, a touch input, and the like. The alarm unit may output a signal for notifying the occurrence of an event in a form other than an audio signal or a video signal. For example, the alarm unit may output a signal in the form of vibration. The video signal or audio signal may be output through the display unit 130 or the audio output module. Therefore, the display unit 130 and the audio output module may be categorized as part of the alarm unit.

The haptic module generates various tactile effects felt by the user. A typical example of the tactile effects generated by the haptic module is vibration. An intensity, pattern, or the like of vibration generated by the haptic module can also be controlled. For example, different vibrations may be combined and output, or sequentially output.

The haptic module, in addition to vibration, can generate various tactile effects, including an effect by stimulation such as a pin arrangement vertically moving against the contacted skin surface, an ejection or suction force of air through the ejection or suction port, a brush against the skin surface, a contact of the electrode, electrostatic force, or the like, or an effect by reproduction of thermal sense using a heat absorption or generation device.

The haptic module may also be implemented to feel a tactile effect through muscular senses by a finger or arm of the user, as well as to transfer a tactile effect through direct contact. Two or more haptic modules may also be used according to a configuration of the apparatus 100 for computing a vehicle path by considering satellite communication channel states.

The memory may store software programs for processing and controlling a control unit 160, or temporarily stores data (for example, a phonebook, message, still image, video, and the like) which are input and/or output. The memory may store data relating to various patterns of vibrations and sounds output when touch input to a touch screen is sensed.

The memory may include at least one type of storage medium including a flash memory type, a hard disk type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the apparatus 100 for computing a vehicle path may operate a web storage that performs the storage function of the memory on the Internet.

If the display unit 130 and a touch sensor have a layered structure therebetween, the display unit 130 may be used as an input device rather than an output device. Such display unit 130 may be referred to as 'touch screen'.

When touch inputs on the touch screen are sensed, corresponding signals are transmitted to a touch controller (not shown). The touch controller processes the received signals, and then transmits corresponding data to the controller 160. Accordingly, the controller 160 may sense which region of the display unit 130 has been touched.

When the touch screen is implemented as a capacitance type, proximity of a pointer to the touch screen is sensed by changes of an electromagnetic field. In this case, the touch screen may be categorized into a proximity sensor.

The path calculation unit 110 searches for a plurality of candidate paths, each path connected from a starting point to a destination. The controller 160 may set a point where the path calculation unit 110 is located, as a starting point, using GPS information received from the wireless communication unit 150. Alternatively, the controller 160 may receive, from a user, at least one of a starting point and a destination.

The path calculation unit 110 calculates a basic path corresponding to a search condition. The search condition may include at least one of a shortest distance, a shortest time, via highway and via roadway. The search condition may be set by a user, or may be preset as a value stored in the memory.

The electric wave analysis unit 120 is configured to analyze satellite communication channel states on a plurality of candidate paths including a plurality of sectional paths. The satellite communication channel state means a receiving sensitivity of an electric wave received from a satellite.

The satellite communication channel state means a signal receiving sensitivity, such as whether a satellite communication channel is clear without any obstacles on a signal receiving path, whether propagation loss has occurred due to a blocked state by leaves, etc., whether channel disconnection has occurred due to a large loss resulting from a blocked state by buildings, etc.

The controller 160 controls the overall operations of the apparatus 100 for computing a vehicle path. For instance, the controller 160 performs related controls and processes for guiding a path. The path calculation unit 110 and the electric wave analysis unit 120 may be implemented in the controller 160, or may be separately implemented from the controller 160.

Figure 2:
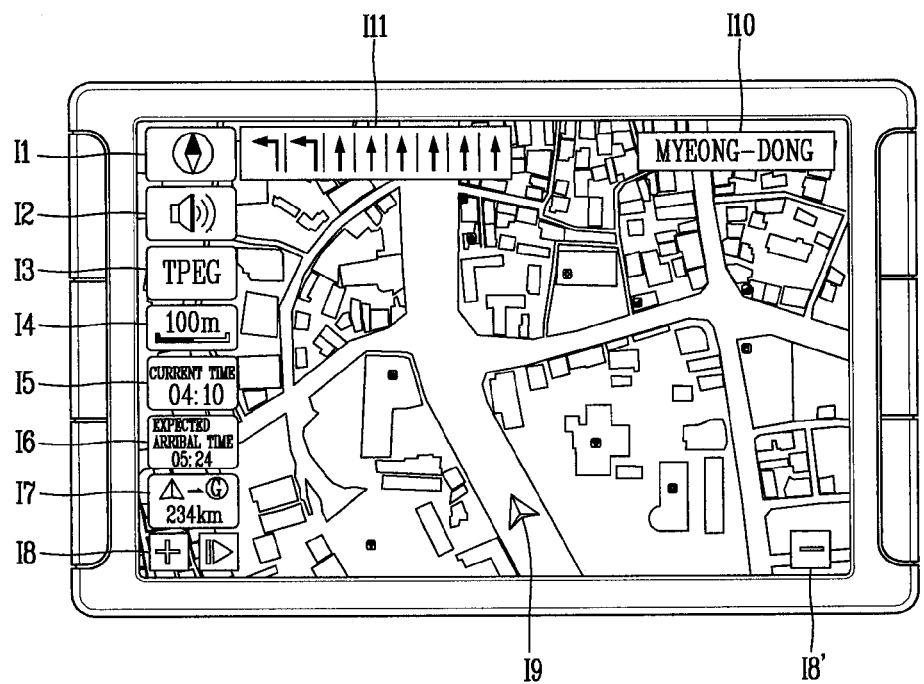
FIG. 2 is a view for explaining a screen of a display unit of the apparatus according to an embodiment of the present invention.

FIG. 2 is a view for explaining a screen of a display unit of the apparatus for computing a vehicle path according to an embodiment of the present invention.

In a case where the display unit of FIG. 2 is implemented as a portable phone, a smart phone, a notebook computer, a digital broadcasting terminal, a PDA, a PMP, etc., some of the components of FIG. 2 may be displayed, or none of the components of FIG. 2 may be displayed.

As shown in FIG. 2, the display unit may display an icon (I1) indicating an azimuth of a map, on one region of a screen. The display unit may display a map in such a manner that a specific direction (e.g., true north of the earth), a moving direction of a moving body, a direction of a destination, etc. are fixed to an upper side of the screen.

The display unit may display an icon (I2) indicating whether to activate an audio output module or not, and indicating setting of a volume, on one region of the screen. A user may activate or deactivate the audio output module, or control a volume by touching the icon (I2).

The display unit may display an icon (I3) indicating whether to activate a path search function using a Transport Portal Experts Group (TPEG) or not, on one region of the screen. The TPEG means a group for setting traffic information protocols established by the European Broadcasting Union in 1997. However, in a navigation system, the TPEG is widely known as a path guidance function using real time traffic situation information.

The display unit may display an icon (I4) indicating a scale of the map, on one region of the screen.

The display unit may display an icon (I5) indicating a current time, on one region of the screen. Also, the display unit may display an icon (I6) indicating an expected time of arrival at a preset destination, on one region of the screen. The display unit may display the predicted time in various forms rather than the icon (I6).

The display unit may display an icon (I7) indicating a remaining distance up to a preset destination, on one region of the screen.

The display unit may display an icon (I8) for enlarging the displayed map, or an icon (I8') for contracting the displayed map, on one region of the screen.

The display unit may display an icon (I9) indicating a position and a moving direction of a moving body, on one region of the screen. The display unit may display the icon (I9), on a position of the map in correspondence to the current position of the moving body. A moving direction of the moving body may be displayed as a direction of a vertex of an arrow of the icon (I9), etc.

The display unit may display a name of an area to which the moving body has moved, on one region of the screen.

In a case where a road along which the moving body moves is a trafficway, the display unit may display an icon (I11) indicating a configuration of traffic lanes, on one region of the screen.

The display unit may display paths necessary for the moving body to reach a destination. The paths may not be displayed when a destination of the moving body has not been set.

The controller 160 of the apparatus 100 for computing a vehicle path according to an embodiment of the present invention may generate moving image information based on road guidance information in correspondence to a set section, and may output the moving image information to the display unit.

Figure 3:
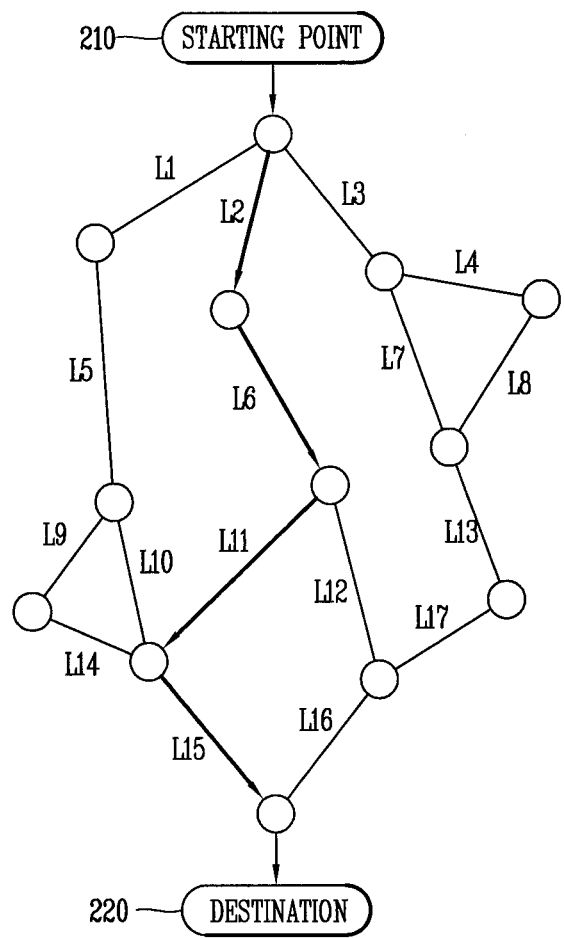
FIGS. 3 to 5 are views for explaining a method for computing a vehicle path by the apparatus according to an embodiment of the present invention.
Figure 4:
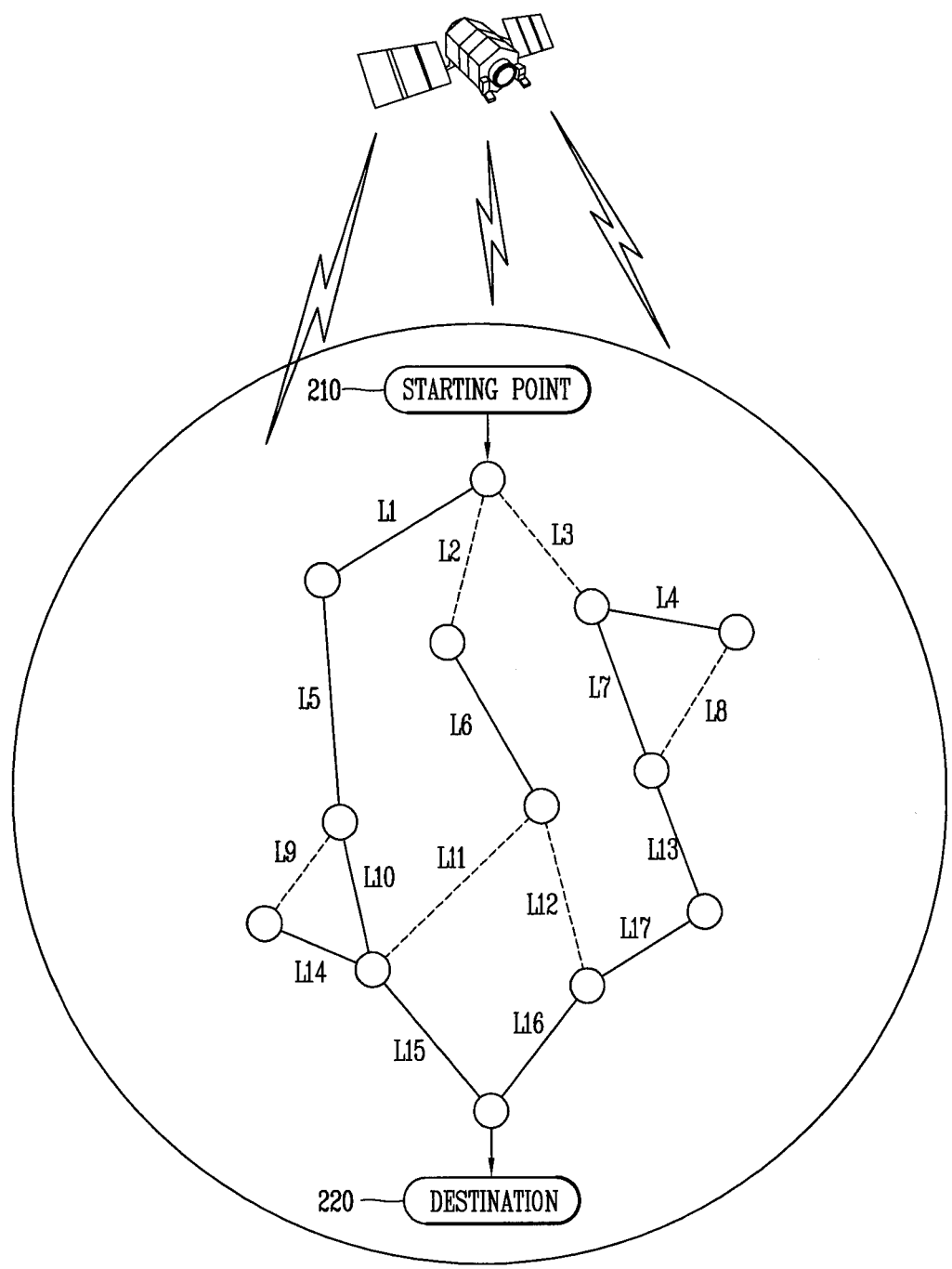
Figure 5:
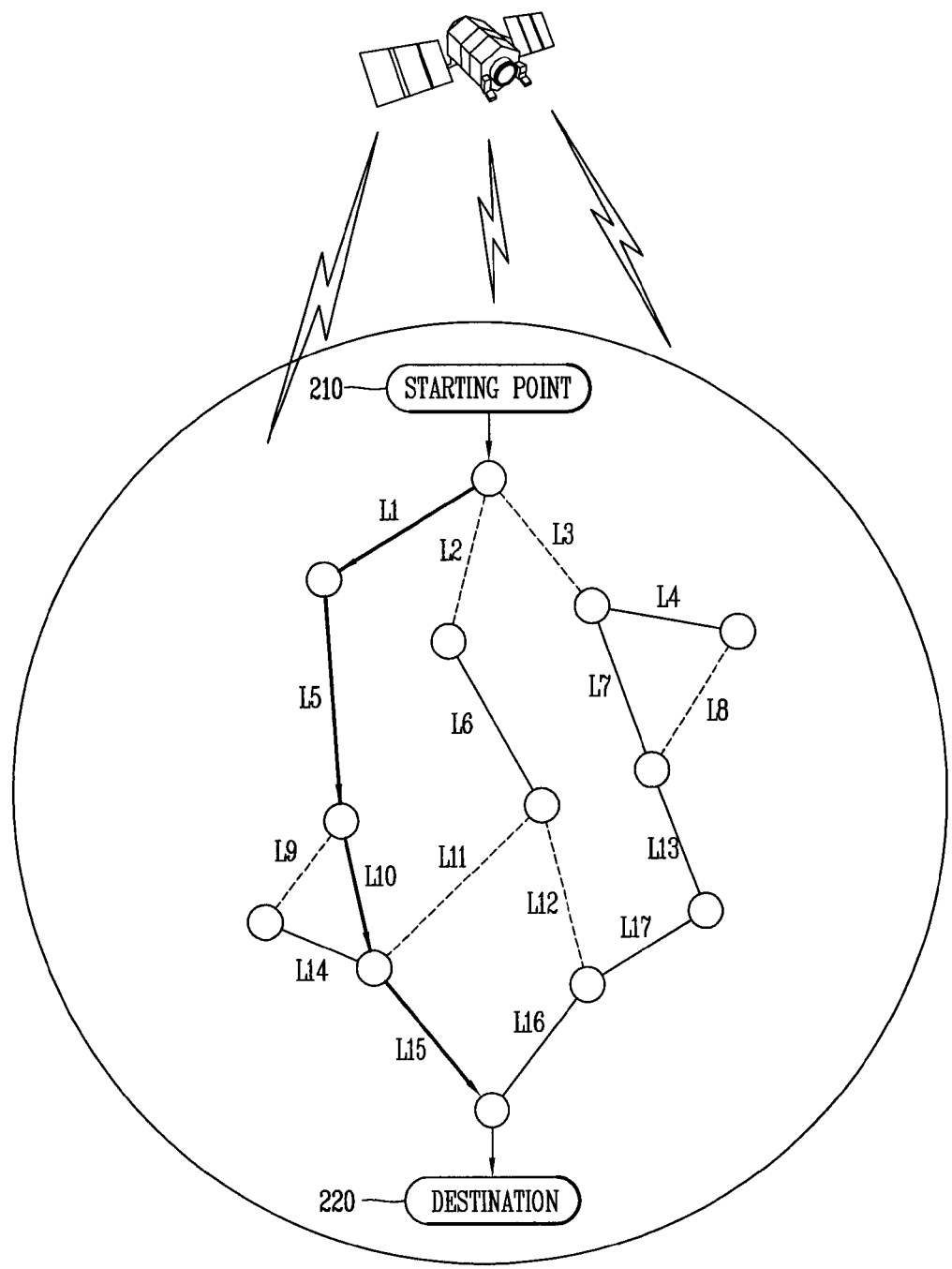

FIGS. 3 to 5 are views for explaining a method for computing a vehicle path by the apparatus 100 for computing a vehicle path according to an embodiment of the present invention.

Referring to FIG. 3, a plurality of candidate paths are illustrated between a starting point 210 and a destination 220. Each of the candidate paths may include a plurality of sectional paths. For instance, 17 sectional paths (L1~L17) are illustrated between the first position 210 and the second position 220. And a plurality of candidate paths including a plurality of sectional paths may be calculated according to search conditions.

More specifically, the plurality of candidate paths of FIG. 3 include a first candidate path having sectional paths L1, L5, L9, L14 and L15, a second candidate path having sectional paths L1, L5, L10 and L15, a third candidate path having sectional paths L2, L6, L11 and L15, a fourth candidate path having sectional paths L2, L6, L12 and L16, a fifth candidate path having sectional paths L3, L7, L13, L17 and L16, and a sixth candidate path having sectional paths L3, L4, L8, L13, L17 and L16.

In a case where a searching condition is a shortest distance, the third candidate path having 4 sectional paths L2, L6, L11 and L16 may be selected from the plurality of candidate paths, to thus be set as a basic path. Various candidate paths may be calculated as a basic path according to search conditions.

The path calculation unit 110 may use a Dijkstra-EX algorithm when calculating a basic path.

Referring to FIG. 4, the electric wave analysis unit 120 may calculate a satellite signal level on each of the plurality of sectional paths. The satellite signal level may be derived by considering a plurality of factors, which will be explained later. When calculating candidate paths, sections where a satellite signal level is a threshold value or less than, may be excluded from the entire sectional paths.

For instance, in a case where the number of sectional paths where a level of a satellite signal received from a satellite 300 is a threshold value or less than is 6 (L2, L3, L8, L9, L11 and L12), the sectional paths (L2, L3, L8, L9, L11 and L12) may be excluded from the entire 17 sectional paths (L1~L17). The reason is because a satellite signal may not be well received or may not be received when the apparatus 100 for computing a vehicle path enters the sectional paths (L2, L3, L8, L9, L11 and L12).

Referring to FIG. 5, the path calculation unit 110 may determine a new path different from a basic path, by connecting a plurality of sectional paths where a satellite signal level is a prescribed threshold value or more than, to each other, by considering a satellite signal level on each sectional path calculated by the electric wave analysis unit 120.

As aforementioned in FIG. 3, the path calculation unit 110 sets the third candidate path having 4 sectional paths, L2, L6, L11 and L15 as a basic path. However, the path calculation unit 110 may set the first candidate path having 5 sectional paths L1, L5, L9, L14 and L15 as a final path, by excluding, from the entire sectional paths, the sectional paths L2 and L11 where a satellite signal level is a threshold value or less than. In this case, the basic path and the final path may be the same.

Figure 6:
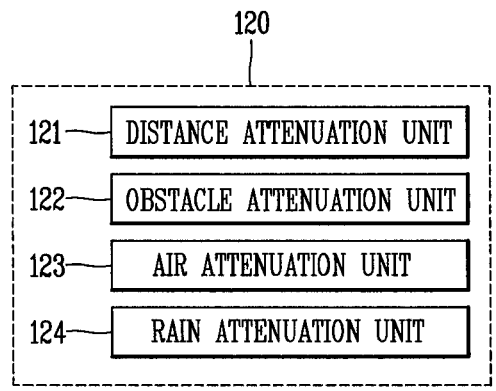
FIG. 6 is a block diagram illustrating a configuration of an electric wave analysis unit according to an embodiment of the present invention.

Hereinafter, a process to analyze satellite communication channel states by the electric wave analysis unit 120 will be explained in more detail with reference to FIG. 6. FIG. 6 is a block diagram illustrating a configuration of the electric wave analysis unit 120 according to an embodiment of the present invention.

Referring to FIG. 6, the electric wave analysis unit 120 performs a simulation based on an analysis algorithm with respect to satellite communication channel states. A plurality of attenuation units for analyzing a receiving sensitivity of an electric wave may include a distance attenuation unit, an obstacle attenuation unit, an air attenuation unit and a rain attenuation unit.

More specifically, the analysis algorithm of the electric wave analysis unit 120 may include a distance attenuation unit 121 configured to analyze a first propagation loss due to a distance between a position on each of the plurality of candidate paths and the satellite 300, an obstacle attenuation unit 122 configured to analyze a second propagation loss due to buildings which exist within a prescribed range on each of the plurality of candidate paths, an air attenuation unit 123 configured to analyze a third propagation loss due to signal attenuation due to air on the plurality of candidate paths, and a rain attenuation unit 124 configured to analyze a fourth propagation loss due to signal attenuation due to rain on the plurality of candidate paths.

The obstacle attenuation unit 122 may include a building attenuation unit and a ground attenuation unit. The building attenuation unit is configured to analyze an attenuation amount of a satellite signal diffracted by buildings. And the ground attenuation unit is configured to analyze an attenuation amount of a satellite signal occurring due to trees or a ground, by considering a type of a ground on the plurality of candidate paths.

The distance attenuation unit 121 calculates a distance between the satellite 300 and a receiving point which receives a satellite signal from the satellite 300. Then, the distance attenuation unit 121 extracts an elevation angle and an azimuthal angle of the satellite 300 based on the calculated distance, thereby acquiring location information or azimuth information of the satellite 300. Then, the distance attenuation unit 121 may derive a first propagation loss by calculating propagation loss due to paths in space, by considering a gain of a receiving side antenna and a gain of a satellite side antenna.

The building attenuation unit of the obstacle attenuation unit 122 is configured to calculate an attenuation amount of a signal due to diffraction by buildings, based on a knife-edge model. For instance, the building attenuation unit may derive a second propagation loss by considering a height of a building, a height of a moving body, and a distance between a building and a vehicle, and by considering an incident angle of a signal according to a position of the satellite 300.

Processes to search for buildings may be performed as follows.

Firstly, a matrix structure, which has a prescribed radius within a set range from the current position of a moving body, is generated. Then, buildings which are within the prescribed radius based on the current position, are searched. The building search may be performed by utilizing map data stored in the memory. However, the present invention is not limited to this. More specifically, buildings stored in a server with an additional configuration may be searched using wireless Internet.

Then, an azimuth of the satellite 300 is calculated from the current position of the moving body. And it is searched whether there exists any building positioned at a corresponding azimuth. If the number of searched buildings is plural, a building closest to the moving body is selected, and information on a height of a finally-searched building is acquired. The building attenuation unit may calculate propagation loss based on the acquired height information. The height information may be acquired by utilizing building data stored in a path guidance device such a navigation system of a vehicle. However, the present invention is not limited to this. That is, the height information may be acquired using an additional configuration.

In a case where a ground on a corresponding sectional path is a forest area, the ground attenuation unit of the obstacle attenuation unit 122 is configured to determine signal attenuation by considering a diffraction effect due to trees, etc. For this, the ground attenuation unit may consider a length of the forest area, an inclination angle of the forest area, etc. And the ground attenuation unit may consider propagation loss due to a diffraction angle of a transmitting antenna (antenna of the satellite), and propagation loss due to a diffraction angle of a receiving antenna (antenna of the apparatus for computing a vehicle path).

The obstacle attenuation unit 122 may search for one or more obstacles on a path, and may apply a different attenuation ratio according to a type of the searched obstacle (e.g., vegetation area or forest), thereby acquiring propagation loss.

The air attenuation unit 123 and the rain attenuation unit 124 utilize weather information received from a server. That is, the air attenuation unit 123 and the rain attenuation unit 124 may receive, from a server, weather information of a position on each of the plurality of candidate paths. And the air attenuation unit 123 and the rain attenuation unit 124 may derive propagation loss occurring due to weather, based on the received weather information.

The air attenuation unit 123 may derive a third propagation loss, signal attenuation due to air, by considering an atmospheric pressure, a temperature, a humidity, a frequency of a satellite signal and a frequency-dependent complex refractivity.

The rain attenuation unit 124 may derive a fourth propagation loss, signal attenuation due to rain, by considering a frequency of a satellite signal, a rainfall per hour and a rain attenuation coefficient.

The apparatus 100 for computing a vehicle path by considering a condition of satellite communication according to the present invention can calculate a basic path corresponding to a search condition. Further, the apparatus 100 can derive a final path by connecting sectional paths where a satellite signal level is more than a prescribed value, to each other, by considering satellite communication channel states.

Figure 7:
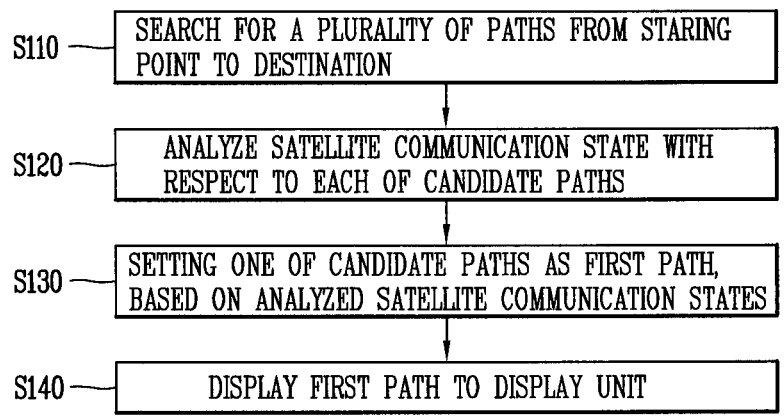
FIG. 7 is a flowchart for explaining a method for computing a vehicle path according to an embodiment of the present invention.

Hereinafter, a method for computing a vehicle path by considering a condition of satellite communication according to an embodiment of the present invention will be explained with reference to FIGS. 7 and 8. FIG. 7 is a flowchart for explaining a method for computing a vehicle path according to an embodiment of the present invention.

Referring to FIG. 7, a method for computing a vehicle path according to an embodiment of the present invention comprises searching for a plurality of candidate paths, each path connected from a starting point to a destination. The candidate paths may include stops between a starting point and a destination. Information on at least one of a starting point, a destination and stops may be mainly input by a user's input unit. However, a controller may set the information using GPS information, or may set the information using information received from a server.

The candidate paths may be paths searched under a search condition such as a shortest distance or a minimum time-taken distance. For instance, if a shortest distance is set as a search condition, 10 candidate paths aligned in order of a shortest distance may be searched. The number or search conditions of the candidate paths to be searched may be controlled by a user.

Next, a satellite communication channel state of each candidate path may be analyzed (S120). The electric wave analysis unit 120 is configured to analyze a satellite communication channel state of each candidate path on a position from a starting point to a destination. For instance, the electric wave analysis unit 120 may analyze all positions from a starting point to a destination, or may analyze a position on a path of the plurality of candidate paths. Alternatively, the electric wave analysis unit 120 may analyze a prescribed number of positions.

The satellite communication channel states mean a receiving sensitivity of an electric wave received from the satellite, which may be analyzed by propagation loss derived by the electric wave analysis unit 120. The electric wave analysis unit 120 may derive propagation loss using at least one attenuation unit, and may calculate a satellite signal level using the derived propagation loss.

Next, one of the candidate paths may be calculated as a first path based on the satellite communication channel states (S130). Next, the first path may be output to the display unit (S140). The controller 160 may exclude any point where a satellite signal level is a threshold value or less than, from the entire sectional paths, when calculating a vehicle path. Under such configuration, the controller 160 may provide a user with information on a path where a communication channel more than a prescribed receiving sensitivity can be acquired.

FIG. 8 is a flowchart for explaining a method for computing a vehicle path by considering satellite communication channel states according to an embodiment of the present invention.

Referring to FIG. 8, the method for computing a vehicle path according to an embodiment of the present invention comprises receiving a starting point and a destination (S210). One or more stops may be included between the starting point and the destination. A user may input location information through an input means such as a touch panel.

Once the starting point and the destination are input, candidate paths may be calculated based on the input. The candidate paths calculated in this step may be paths before satellite communication channel states are considered, which may be different from a final path to be explained later.

Then, a satellite signal may be received (S220), and azimuth information of the satellite may be extracted through analysis of the received satellite signal (S230). The azimuth information may include an elevation angle or an azimuthal angle of the satellite. The azimuth information of the satellite may be determined by considering a radius of the earth, a distance between the satellite and a position on each of the plurality of candidate paths, a latitude and a longitude of the vehicle.

Then, a first propagation loss may be calculated with respect to a plurality of candidate paths along which the vehicle can move from the starting point to the destination, based on the azimuth information (S240). A satellite signal level, to which the first propagation loss according to each sectional path has been reflected, may be determined by calculating an attenuation amount due to a distance between the satellite and a position on each of the plurality of candidate paths. The candidate paths may be configured as a plurality of sectional paths. A satellite signal level in each sectional path may become different according to peripheral circumstances.

Next, an obstacle which exists within a prescribed range on the plurality of candidate paths may be detected (S250). Then, a second propagation loss may be calculated by considering the obstacle (S260). In this case, the second propagation loss may be calculated by applying a different attenuation ratio according to a type of the obstacle.

The method may comprise calculating a third propagation loss due to signal attenuation resulting from an air condition on the plurality of candidate paths (S270). Further, the method may comprise calculating a fourth propagation loss due to signal attenuation resulting from rain on the plurality of candidate paths (S280).

Next, a sectional path, where a satellite signal level is more than a predetermined threshold value or the satellite signal level is a maximized value, may be selected from the plurality of candidate paths, by considering satellite communication channel states including the first to fourth propagation losses. Based on the selected sectional path, a final path having an excellent satellite communication channel state may be determined from the plurality of candidate paths (S290). In another embodiment, some of the first to fourth propagation losses may be omitted, or additional propagation losses may be considered.

In the present invention, a vehicle path, which has an optimum communication channel from a starting point to a destination, can be calculated by considering electric wave characteristics in a downtown area, an open terrain and a mountainous territory based on the conventional path search algorithm. Further, a simulation can be performed based on an analysis algorithm with respect to satellite communication channel states. In this case, a satellite signal strength at each section can be derived by considering signal attenuation due to a distance between a satellite and a position on each of the plurality of candidate paths, signal attenuation due to buildings on a path, signal attenuation due to air, signal attenuation due to rain, and signal attenuation due to an area. A vehicle path, set to pass through only sections having a predetermined signal strength or more than, can be calculated based on the derived satellite signal strength.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A method for computing a vehicle path by considering satellite communication channel states, the method comprising:

searching for a plurality of candidate paths, each path connected from a starting point to a destination;

analyzing a satellite communication channel state with respect to each of the candidate paths, based on a receiving sensitivity of an electric wave received from a satellite;

setting one of the candidate paths as a first path, based on the analyzed satellite communication channel states; and mapping the first path onto a map, and displaying the first path on a display unit, wherein the step of analyzing a satellite communication channel state comprises:

extracting azimuth information from a satellite signal received from the satellite;

calculating propagation loss with respect to each of the candidate paths, further based on the azimuth information by detecting an obstacle positioned within a prescribed range based on a position on each of the candidate paths; and calculating propagation loss occurring due to the detected obstacle by applying a different attenuation ratio based on the type of obstacle; and analyzing the satellite communication channel state based on the calculated propagation loss.

2. The method of claim 1, further comprising:
selecting a second path corresponding to a search condition, from the plurality of candidate paths; and
mapping the second path onto the map, and displaying the second path on the display unit together with the first path.

3. The method of claim 2, further comprising:
receiving one of the first path and the second path from a user; and
providing guidance service to the destination, based on the selected one path and GPS information received from the satellite.

4. The method of claim 2, wherein the search condition comprises at least one of a shortest distance, a shortest time, via highway and via roadway.

5. The method of claim 1, wherein the propagation loss is distance attenuation of the satellite signal, which occurs due to a distance between a position on each of the candidate paths and the satellite.

6. The method of claim 1, wherein the step of calculating propagation loss comprises: receiving, from a server, weather information of a position on each of the candidate paths; and calculating propagation loss occurring due to weather, based on the received weather information.

7. The method of claim 6, wherein the propagation loss is at least one of rain attenuation of the satellite signal due to rain, and air attenuation of the satellite signal due to air.

8. The method of claim 7, wherein the weather information comprises at least one of an atmospheric pressure, a temperature, a humidity and a rainfall per hour.

9. An apparatus for computing a vehicle path by considering satellite communication channel states, the apparatus comprising:
a user input unit configured to receive at least one of a starting point and a destination;
a path calculation unit configured to calculate a plurality of candidate paths, each path connected from the starting point to the destination;
an electric wave analyzing unit configured to analyze a satellite communication channel state with respect to each of the candidate paths, based on a receiving sensitivity of an electric wave received from a satellite; and
a controller configured to select one of the candidate paths as a first path based on the analyzed satellite communication channel states, and configured to output the first path by mapping onto a map; wherein the analyzing unit configured to analyze a satellite communication channel state comprises
an extracting unit configured to extract azimuth information from a satellite signal received from the satellite;
a calculating unit configured to calculate propagation loss with respect to each of the candidate paths, further based on the azimuth information by detecting an obstacle positioned within a prescribed range based on a position on each of the candidate paths; and calculating propagation loss occurring due to the detected obstacle by applying a different attenuation ratio based on the type of obstacle; and
analyzing unit configured analyzing the satellite communication channel state based on the calculated propagation loss.

10. The apparatus of claim 9, wherein the controller is configured to select a second path corresponding to a search condition, from the plurality of candidate paths, and configured to output the second path together with the first path by mapping onto the map.

11. The apparatus of claim 10, wherein upon selection of one of the first path and the second path, the controller provides guidance service to the destination, using the selected one path and GPS information received from the satellite.

12. The apparatus of claim 9, wherein the electric wave analysis unit comprises a distance attenuation unit configured to analyze a first propagation loss, distance attenuation occurring due to a distance between a position on each of the candidate paths and the satellite.

13. The apparatus of claim 12, wherein the electric wave analysis unit further comprises an obstacle attenuation unit configured to detect an obstacle which exists within a prescribed range based on a position on each of the plurality of candidate paths, and configured to analyze a second propagation loss occurring due to the detected obstacle.

14. The apparatus of claim 13, wherein the obstacle attenuation unit is configured to analyze a second propagation loss by applying a different attenuation ratio according to a type of the obstacle.

15. The apparatus of claim 13, wherein the obstacle attenuation unit comprises at least one of:
a building attenuation unit configured to search for buildings which exist within a prescribed range based on a position on each of the plurality of candidate paths, and to analyze propagation loss occurring due to the searched buildings; and
a ground attenuation unit configured to analyze propagation loss due to a ground corresponding to a position on each of the plurality of candidate paths.

16. The apparatus of claim 13, wherein the electric wave analysis unit further comprises an air attenuation unit configured to analyze a third propagation loss, air attenuation occurring due to air at a position on each of the candidate paths.

17. The apparatus of claim 16, wherein the electric wave analysis unit further comprises a rain attenuation unit configured to analyze a fourth propagation loss, rain attenuation occurring due to rain at a position on each of the candidate paths.

* * * * *